United States Patent [19]

Greenslade

[11] Patent Number: 4,955,140
[45] Date of Patent: Sep. 11, 1990

[54] DEVICE FOR MEASURING THREAD MINOR DIAMETER

[76] Inventor: Joe E. Greenslade, 4311 Pheasant Walk, Fort Worth, Tex. 76133

[21] Appl. No.: 427,455

[22] Filed: Oct. 26, 1989

[51] Int. Cl.⁵ .............................................. G01B 3/40
[52] U.S. Cl. ...................................... 33/199 R; 33/829
[58] Field of Search .................. 33/199 R, 199 B, 829

[56] References Cited

U.S. PATENT DOCUMENTS

| | | | |
|---|---|---|---|
| 734,784 | 7/1903 | Wells | 33/829 |
| 1,074,552 | 9/1913 | Kline | 33/829 |
| 1,174,052 | 3/1916 | Burdick | 33/829 |
| 2,624,125 | 1/1953 | Johnson | 33/199 R |
| 2,826,822 | 3/1958 | Noviant | 33/199 R |
| 2,849,797 | 9/1958 | Etchell | 33/501.4 |
| 2,911,725 | 11/1959 | Sleigh | 33/199 R |
| 4,211,013 | 7/1980 | Bresson et al. | 33/803 |
| 4,524,524 | 6/1985 | Frank et al. | 33/701 |
| 4,745,685 | 5/1988 | Castillo | 33/199 R |
| 4,821,422 | 4/1989 | Porter | 33/199 R |

Primary Examiner—William A. Cuchlinski, Jr.
Assistant Examiner—D. Price
Attorney, Agent, or Firm—Charles D. Gunter, Jr.

[57] ABSTRACT

A device is shown for measuring the minor diameter of a screw thread. The device includes a frame and an adjustable indicator blade which moves in a vertical plane for engaging a thread root of a screw arranged on the frame transverse to the adjustable blade. A pair of laterally moveable blades are mounted on the frame oppositely to the adjustable blade for holding a screw therebetween. Each of the laterally moveable blades has a blade point which engages a thread root of the screw at spaced locations along the longitudinal axis of the screw. An indicator is provided for determining the relative distance between the adjustable blade and the blade points of the laterally moveable blades when a screw is held therebetween.

7 Claims, 1 Drawing Sheet

DEVICE FOR MEASURING THREAD MINOR DIAMETER

BACKGROUND OF THE INVENTION

1. Field of the Invention.

The present invention relates to devices for measuring thread characteristics and, specifically, to a device for measuring the thread minor diameter.

2. Description of the Prior Art.

To meet todays demand for assembly efficiency and product reliability, American industry is requiring consistently higher quality components. Accurate thread gaging is one way to improve fastener quality to meet the needs of industry.

There are two basic types of thread gaging. The older, but still widely used type, is the "fixed limit" or "attribute" gaging. External threads are measured with ring gages and internal threads with plug gages. This type gaging only establishes the outer boundaries of the thread and simply indicates whether or not a particular thread falls inside or outside of these boundaries. This type gaging was generally developed in the 1920s and is becoming inadequate for today's higher quality and consistency demands.

Variable or indicating thread gages comprise the second type of commonly available gaging for threads. These devices were developed with dial indicating systems in the 1940s and were improved in the 1980s to include the use of electronic readouts. Variable thread gages provide actual measurements of the thread characteristic being inspected. The threads acceptability is determined by comparing those measurements to the applicable thread standard. The variable gage is generally faster to use and provides greater accuracy than the fixed limit gage.

A variety of variable gages are known for measuring such thread characteristics as pitch diameter, minor or root diameter and major or outer diameter of a screw thread. In the case of root diameter measurements, the prior art variable gages have typically employed a pair of oppositely arranged single point locators, often in the form of V-shaped blades. Such an arrangement allowed the screw being measured to tilt or cant on the test fixture, thereby affecting the accuracy of the root diameter measurement.

The present invention has as its object to provide a measuring device for measuring the minor diameter of a screw thread quickly and accurately.

The invention also has as its object to provide a minor diameter gage having lower gage blades which are independently moveable to a correct gaging position to eliminate gaging problems associated with the devices of the prior art.

Another object of the invention is to improve the accuracy of existing root diameter thread gages without adding significantly to the cost or complexity of the gage.

Additional objects, features and advantages will be apparent in the written description which follows.

SUMMARY OF THE INVENTION

The device of the invention includes a frame and a first locator means carried by the frame for engaging a thread root at a first axial location along the screw being measured. Second cooperating locator means are arranged on the frame oppositely to the first locator means for holding a screw therebetween. The second cooperating locator means have a pair of engagement elements which engage the screw thread root at spaced locations along the longitudinal axis of the screw. Mounting means are provided for mounting the second cooperating locator means on the frame, whereby the engagement elements thereof are independently moveable along an axis generally parallel to the longitudinal axis of the screw. Indicating means are provided on the frame for determining the relative distance between the first and second locator means when a screw is held therebetween.

Preferably, the mounting means is a shaft which is fixed on the frame generally parallel to the screw longitudinal axis with the engagement elements being freely slidable along the shaft. The first locator means is preferably an adjustable blade which is adjustably mounted on the frame for movement in a plane transverse to the longitudinal axis of the screw. The engagement elements of the second locator means preferably comprise a pair of slidable blades, each of the slidable blades being independently slidable along the shaft of the mounting means.

DETAILED DESCRIPTION OF THE INVENTION

Figure 1:
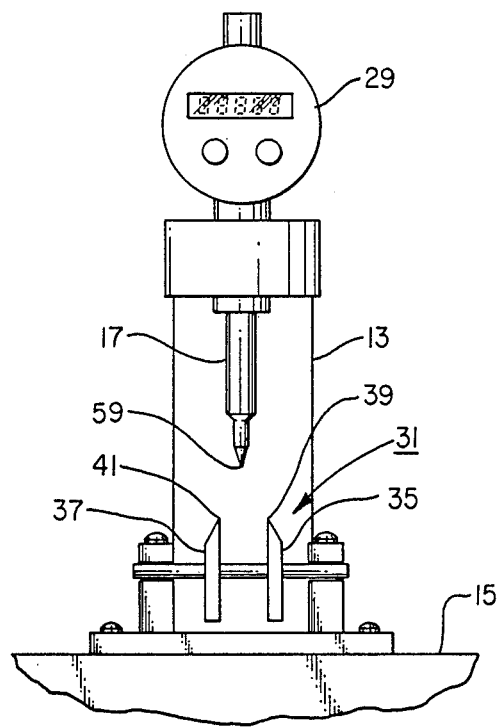
FIG. 1 is a simplified front view of the device of the invention showing the first and second locator means thereof in the spaced-apart position.
Figure 2:
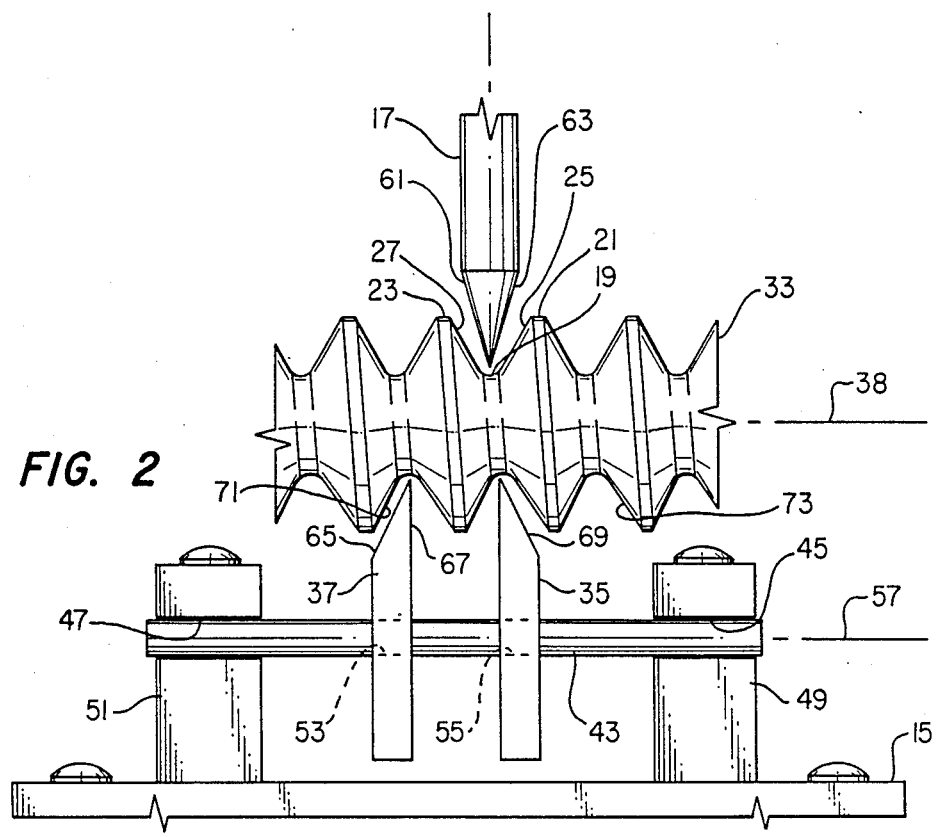
FIG. 2 is an isolated, close-up view of the first and second locator means of FIG. 1 in position on a thread to be measured.

FIG. 1 shows a device for measuring the minor diameter of a screw thread the device being designated generally as 11. The device of the invention includes a frame having an upright portion 13 and a base portion 15 (shown broken away in FIG. 1). A first locator means 17 is carried by the frame. Preferably, the first locator means 17 is an adjustable blade which is mounted on the frame upright 13 for movement in a vertical plane. As shown in FIG. 2, the adjustable blade is adapted to engage a thread root 19 which is defined between the spaced crests 21, 23 and opposing flanks 25, 27 of the screw thread. The adjustable blade 17 has associated therewith an indicating means 29 which accurately detects the up and down movement of the adjustable blade 17 in the vertical plane.

Frames having adjustable locator blades and associated indicating means will be familiar to those skilled in the art and are shown, for instance, in U.S. Pat. No. 2,624,125, to Johnson, issued Jan. 6, 1953 and U.S. Pat. No. 2,826,822 to Noviant, issued Mar. 18, 1958, the disclosure of which is incorporated herein by reference. Although the indicating means 29 is shown as an electronic readout, a dial indicator of the type shown in U.S. Pat. No. 2,624,125 or a micrometer indicator of the type shown in U.S. Pat. No. 2,826,822 could be used as well. U.S. Pat. No. 4,821,422 discloses a translational indicator assembly which displays a digital readout and which is commercially available and the disclosure of this patent is hereby incorporated by reference with respect to the digital indicator means 29 shown in FIG. 1.

Second cooperating locator means, designated generally as 31 in FIG. 1, are arranged on the frame oppositely to the first locator means 17 for holding a screw 33 therebetween. The second cooperating locator means 31 includes a pair of engagement elements 35, 37 which engage the screw thread root 19 at spaced locations along the longitudinal axis of the screw, as shown in FIG. 2. Preferably, the engagement elements are laterally moveable blades, each of which has a blade point 39, 41 which engages a thread root 19 of the screw 33 at spaced locations along the longitudinal axis 38 of the screw.

Mounting means are provided for mounting the engagement elements 35, 37 on the frame, whereby the engagement elements are independently moveable along an axis which is generally parallel to the longitudinal axis 38 of the screw. Preferably, the mounting means includes a shaft such as ground pin 43 which is retained in openings 45, 47 provided in a pair of spaced-apart base uprights 49, 51. Most preferably, a pair of shafts 43 are mounted in parallel fashion (one of which is shown in FIG. 2) within openings provided in the uprights 49, 51. The shafts pass through ground openings 53, 55 provided in each of the laterally moveable blades 35, 37. The blades 35, 37 are independently slidable along the axis 57 of the shaft 43 in a plane generally parallel to the plane of the screw axis 38.

As best shown in FIG. 2, the adjustable blade 17 terminates in a blade point 59 which defines an equilateral triangle when viewed from the side. The sides 61, 63 of the triangle meet at an apex which defines an included angle of less than about 60°. Preferably, the included angle is in the range from about 52° to 59°, most preferably about 55°.

The laterally moveable blades each terminate in a point 39, 41 which defines a right triangle when viewed from the side. Each of the sides of each triangle 65, 67 meets at an apex which defines an included angle of less than about 30°. Preferably, the angle is in the range from about 22-29°, most preferably about 27.5°. As shown in FIG. 2, the laterally moveable blades 35, 37 face oppositely on the shaft 43 so that the sloping sides 65, 69 slope in opposite directions.

The operation of the device of the invention will now be described. In order to measure the minor diameter of a screw 33, the indicator 29 is first calibrated to the zero position in the visual manner. The screw is then placed on the laterally moveable blades 35, 37 and the blades are moved along the shaft 43 until the correct gaging position is achieved with the sloping sides 65, 67 of the laterally moveable blades 35, 37 mating with the flanks 71, 73 of the thread. Because a pair of laterally moveable blades 35, 37 are utilized and the blades are located at spaced axial positions, the thread is firmly positioned in a plane parallel to the base. Because the blades 35, 37 are laterally moveable, threads of varying diameters and thread spacings can be accommodated.

The adjustable blade 17 is then lowered vertically downward until the point 59 contacts the root 19 of the thread and the relative distance between the points 59 and 39, 41 is determined by the indicator 29 to give an accurate measure of the root diameter of the thread.

An invention has been provided with several advantages. The laterally moveable blades accurately position each screw to be measured and prevent canting or tilting of the screw as the adjustable blade is lowered for the thread measurement. The laterally moveable blades can be positioned at varying axial locations along the length of the thread to accommodate varying screw sized and thread spacings. The device is simple in design and economical to manufacture. The device is also extremely simple to use, yet providing a highly accurate measurement of thread minor diameter.

While the invention has been shown in only one of its forms, it is not thus limited but is susceptible to various changes and modifications without departing from the spirit thereof.

I claim:

1. A device for measuring the minor diameter of a screw thread on a screw having a longitudinal axis, the device comprising:
    a frame;
    first locator means carried by the frame for engaging a thread root at a first axial location along the screw;
    second cooperating locator means arranged on the frame oppositely to the first locator means for holding the screw therebetween, the second cooperating locator means having a pair of engagement elements which engage the screw thread root at spaced locations along the longitudinal axis of the screw;
    mounting means for mounting the second cooperating locator means on the frame, whereby the engagement elements thereof are independently movable along an axis generally parallel to the longitudinal axis of the screw,
    indicating means for determining a relative distance between the first and second locator means when the screw is held therebetween; and
    wherein the mounting means is a shaft fixed on the frame generally parallel to the screw longitudinal axis, the engagement elements being freely slidable along the shaft.

2. The device of claim 1, wherein the first locator means is an adjustable blade which is adjustably mounted on the frame for movement in a plane transverse to the longitudinal axis of the screw.

3. The device of claim 2, wherein the engagement elements of the second locator means comprise a pair of slidable blades, each of the slidable blades being independently slidable along the shaft of the mounting means.

4. A device for measuring the minor diameter of a screw thread on a screw having a longitudinal axis, the thread having spaced crests and opposing flanks which define a thread root therebetween, the device comprising:
    a frame;
    an adjustable indicator blade mounted on the frame for movement in a vertical plane for engaging the thread root of the screw arranged on the frame transverse to the adjustable blade, the adjustable blade being fixed against lateral movement perpendicular to the vertical plane;
    a pair of laterally movable blades mounted on the frame oppositely to the adjustable blade for holding the screw therebetween, the laterally movable blades each having a blade point which engages the thread root of the screw at spaced locations along the longitudinal axis of the screw;
    indicating means for determining a relative distance between the adjustable blade and the blade points of the laterally movable blades when the screw is held therebetween; and
    a shaft located on the frame beneath the adjustable blade and arranged generally transverse thereto, each of the laterally movable blades being slidably mounted on the shaft for independent movement.

5. The device of claim 4, wherein the adjustable blade terminates in a blade point which defines an equilateral triangle having sides, the sides of the equilateral triangle meeting at an apex which defines and included angle of less than about 60 degrees.

6. The device of claim 5, wherein the laterally movable blades each terminate in a point which defines a right triangle having sides, the sides of each right triangle meeting at an apex which defines an included angle of less than about 30 degrees.

7. The device of claim 6, wherein the laterally movable blades face oppositely on the shaft.

* * * * *